US005997313A

United States Patent [19]
Jones et al.

[11] Patent Number: 5,997,313
[45] Date of Patent: Dec. 7, 1999

[54] RETROFIT/INTERFACE ADAPTER

[75] Inventors: Robert E. Jones, Dormont; James J. Garver, Gibsonia, both of Pa.

[73] Assignee: Weiss Instrument, Inc., Pittsburgh, Pa.

[21] Appl. No.: 09/081,220

[22] Filed: May 19, 1998

Related U.S. Application Data

[60] Provisional application No. 60/047,048, May 19, 1997.

[51] Int. Cl.[6] .................................................. H01R 9/09
[52] U.S. Cl. .............................. 439/61; 361/736; 361/803
[58] Field of Search ........................ 439/61, 65; 361/736, 361/744, 784, 796, 803

[56] References Cited

U.S. PATENT DOCUMENTS

| | | | |
|---|---|---|---|
| 3,904,934 | 9/1975 | Martin | 439/61 |
| 5,530,622 | 6/1996 | Takiar et al. | 361/730 |
| 5,570,269 | 10/1996 | Korikawa et al. | 361/685 |
| 5,731,961 | 3/1998 | Bernhardt et al. | 361/796 |
| 5,885,089 | 3/1999 | Ruque | 439/61 |

*Primary Examiner*—Neil Abrams
*Assistant Examiner*—J. F. Duverne
*Attorney, Agent, or Firm*—Webb Ziesenheim Logsdon Orkin & Hanson, P.C.

[57] ABSTRACT

An interface adapter enables a replacement controller to be mechanically received in a housing configured for an older model controller having a larger volume. Moreover, the interface adapter enables terminals of the replacement controller having a first configuration to be connected to the contacts of a housing connecter having a second configuration configured to couple with contacts of the older model controller. The interface adapter includes a faceplate having a central aperture for receiving the replacement controller and a pair of sideboard printed circuit boards (PCBs) positioned perpendicular to a surface of the faceplate in spaced parallel relation on opposite sides of the central receiving aperture. A main PCB is electrically and mechanically connected between the sideboard PCBs. The main PCB and the sideboard PCBs have contacts adjacent their ends opposite the faceplate. A first connector has a first part affixed to the main PCB and has contacts electrically connected to the contacts of the main PCB and the sideboard PCBs. The first connector has a second part electrically connected to terminals of the replacement controller via flexible conductors. The replacement controller and the interface adapter are assembled by inserting the replacement controller through the central receiving aperture of the faceplate and connecting the first and second parts of the first connector. The assembled interface adapter is inserted into the housing and the contacts of the main PCB and the sideboard PCBs are moved into connecting engagement with the contacts of the housing connector.

15 Claims, 8 Drawing Sheets

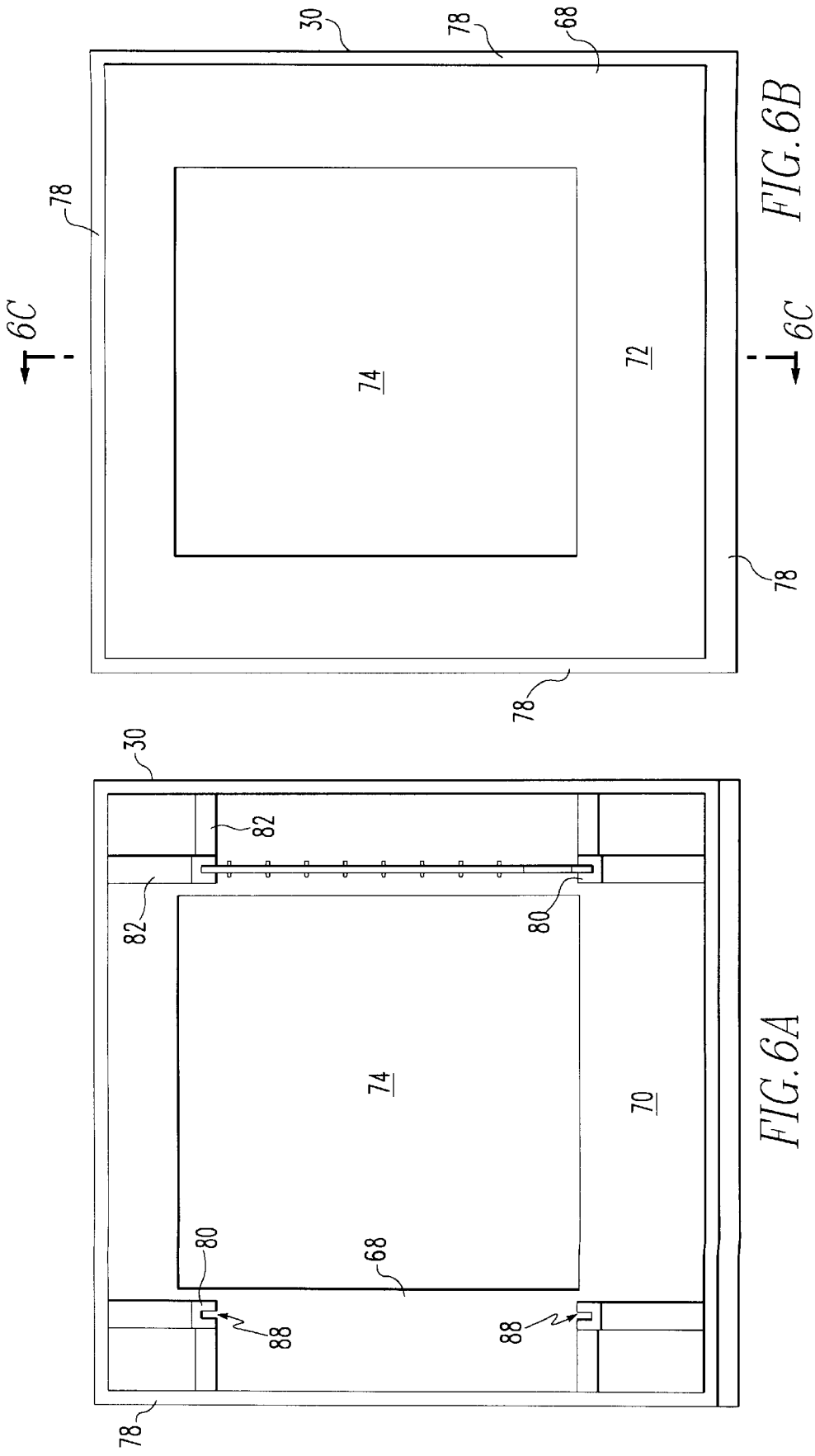

RETROFIT/INTERFACE ADAPTER

CROSS REFERENCE TO RELATED APPLICATIONS

The application claims the benefit of United States Provisional Patent Application Ser. No. 60/047,048, filed May 19, 1998.

BACKGROUND OF THE INVENTION

1. Field of the Invention

Th is invention relates to an interface adapter which enables terminals of a replacement controller having a first configuration to be connected to connectors of a housing having a second configuration.

2. Background Art

Process controllers are often received in protective housings which protect the controller from the environment and which provide for easy installation and removal of the controller. Such housings typically include an array of terminals positioned on the back of the housing. These terminals are electrically connected to contacts inside the housing. These contacts are received within a housing connector that is attached to the housing or is formed as an integral part of the housing. When the controller is inserted into the housing, terminals or contacts positioned on the controller connect to the contacts of the housing connector. More specifically, the contacts or terminals of the controller and the contacts of the housing connector have the same configuration. Hence, when the controller is inserted in the housing, the contacts of the controller are positioned to connect with the contacts of the housing connector. Examples of such controllers include Barber Colman Company 560/570 Controllers.

Microelectronic miniaturization enables controllers performing the same or more functions to be packaged into a smaller volume than an older model controller. In the event it is necessary to replace an older model controller with a replacement controller having a smaller volume, there arises a need to interface the replacement controller to the contacts of the housing connecter. However, heretofore electrical connection of such a replacement controller to contacts of a housing connector required extensive manual wiring therebetween or complete replacement and upgrading of the housing at additional costs of materials and labor to install.

It is the object of the present invention to avoid the foregoing problems by providing an interface adapter which enables electrical connection between terminals of a replacement controller having a first configuration and contacts of a housing connector having a second configuration.

Still other objects will become apparent to those of ordinary skill in the art upon reading and understanding the following detailed description.

SUMMARY OF THE INVENTION

Accordingly, we have invented a controller interface adapter which enables electrical connection between terminals of a replacement controller having a first configuration and connectors of a housing having a second configuration. The interface adapter includes a main printed circuit board (PCB) having a plurality of first contacts and a pair of sideboard PCBs. Each sideboard PCB has a plurality of second contacts and a receiving slot formed in one side thereof. A faceplate is provided having a receiving aperture configured to receive the replacement controller. A first securing means is provided for securing the sideboard PCBs and the faceplate together so that the sideboard PCBs are positioned on one surface of the faceplate and in spaced parallel relation on opposite sides of the faceplate receiving aperture, with the receiving slots of the sideboard PCBs positioned in opposition. A first electrical connector electrically connects the plurality of first contacts and the terminals of the replacement controller. A second securing means secures the main PCB and the sideboard PCBs together so that the sideboard PCBs are maintained in the spaced parallel relation. The second securing means also electrically connects the plurality of second contacts and the terminals of the replacement controller via the first electrical connector. The first securing means and the second securing means secure the main PCB, the faceplate and the sideboard PCBs orthogonally.

The interface adapter can include an option PCB having a plurality of third contacts. The option PCB is receivable between the sideboard PCBs and in the receiving slots thereof. Opposite sides of the option PCB frictionally coact with opposite sides of the receiving slots of the sideboard PCBs to secure the option PCB therein in opposition to the main PCB which is positioned adjacent sides of the sideboard PCBs opposite the receiving slots thereof.

Preferably, the first securing means includes a plurality of braces formed on a surface of the faceplate. Each brace has a proximal end, a distal end and a lengthwise slot that extends therebetween. Each brace also has a locking tab receiving slot formed therein adjacent the proximal end thereof. A plurality of locking tabs are formed on the side edges of the sideboard PCBs, with each side edge of each sideboard PCB including one of the plurality of locking tabs. The plurality of braces are positioned so that the locking tabs are received in the locking tab receiving slots when the side edges of the sideboard PCBs are received in the lengthwise slots.

The first electrical connector preferably includes a first part connected to the main PCB and a second part flexibly connected to the terminals of the replacement controller via a plurality of flexible conductors. The first part of the first electrical connector is couplable to the second part of the first electrical connector.

The second securing means preferably includes a pair of edge connectors positioned on the main PCB and a protrusion formed on one of the sides of each sideboard PCB. The protrusion of each sideboard PCB is couplable with an edge connector of the main PCB.

The interface adapter can include a thermocouple connector positioned on the main PCB. The thermocouple connector includes a pair of contacts which are each electrically connected to one or more of the plurality of first contacts. The contacts of the thermocouple connector are also connectable to thermocouple terminals of the replacement controller via flexible connectors.

BRIEF DESCRIPTION OF THE DRAWINGS

FIGS. 3a–3c are plan, side and front views of the main printed circuit board (PCB) of the interface adapter shown in FIGS. 2a and 2b;

FIGS. 6a and 6b are back and front views of the faceplate of the interface adapter shown in FIGS. 2a and 2b;

DETAILED DESCRIPTION OF THE PREFERRED EMBODIMENT

Figure 1A:
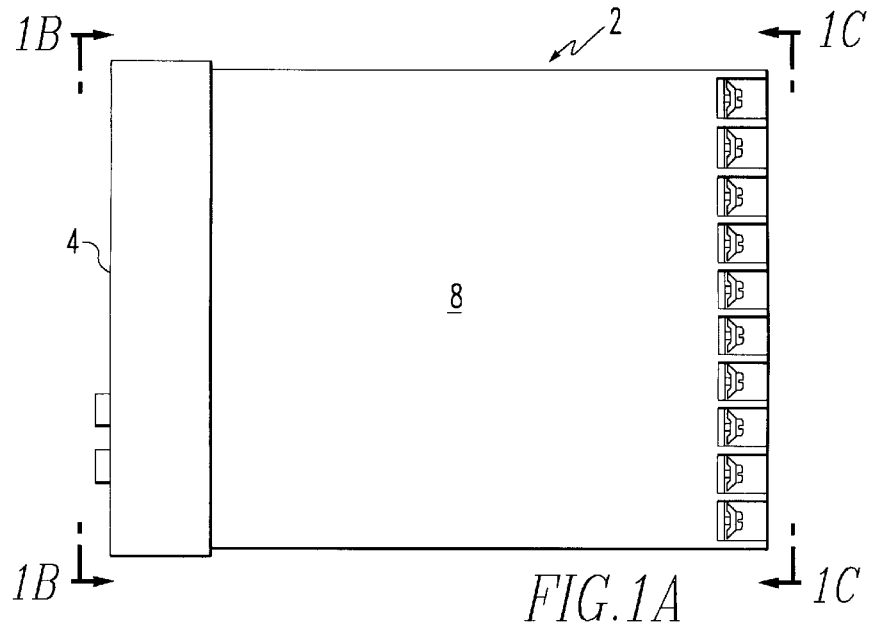
FIGS. 1a–1c are side, front and back views of a replacement controller.
Figure 1B:
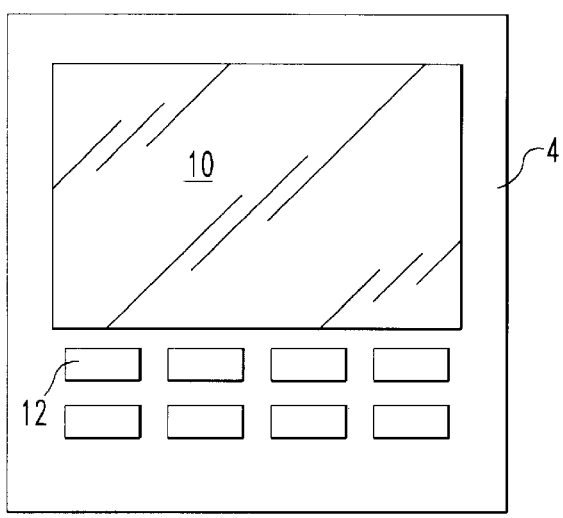
Figure 1C:
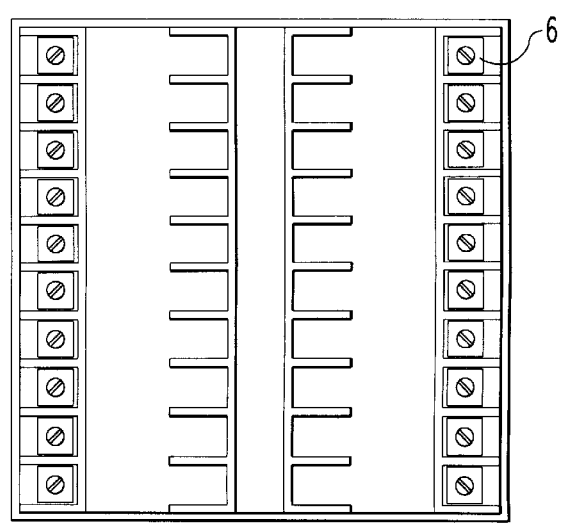

With reference to FIGS. 1a–1c, a replacement controller 2 includes a front panel 4 and an array of terminals 6 positioned a t opposite ends of a controller body 8. The front panel 4 includes a display 10 and one or more buttons 12 connected to program controlled control electroncics (not shown) disposed in a housing 16. The control electronics are programmed via the one or more buttons 12. The control electronics are connected to receive input and provide output to selected terminals 6 in accordance with the programming of the control electronics. The terminals 6 are arranged in a first configuration and are connectable to various input/output devices (not shown) associated with a process to be controlled by the replacement controller 2.

Figure 2A:
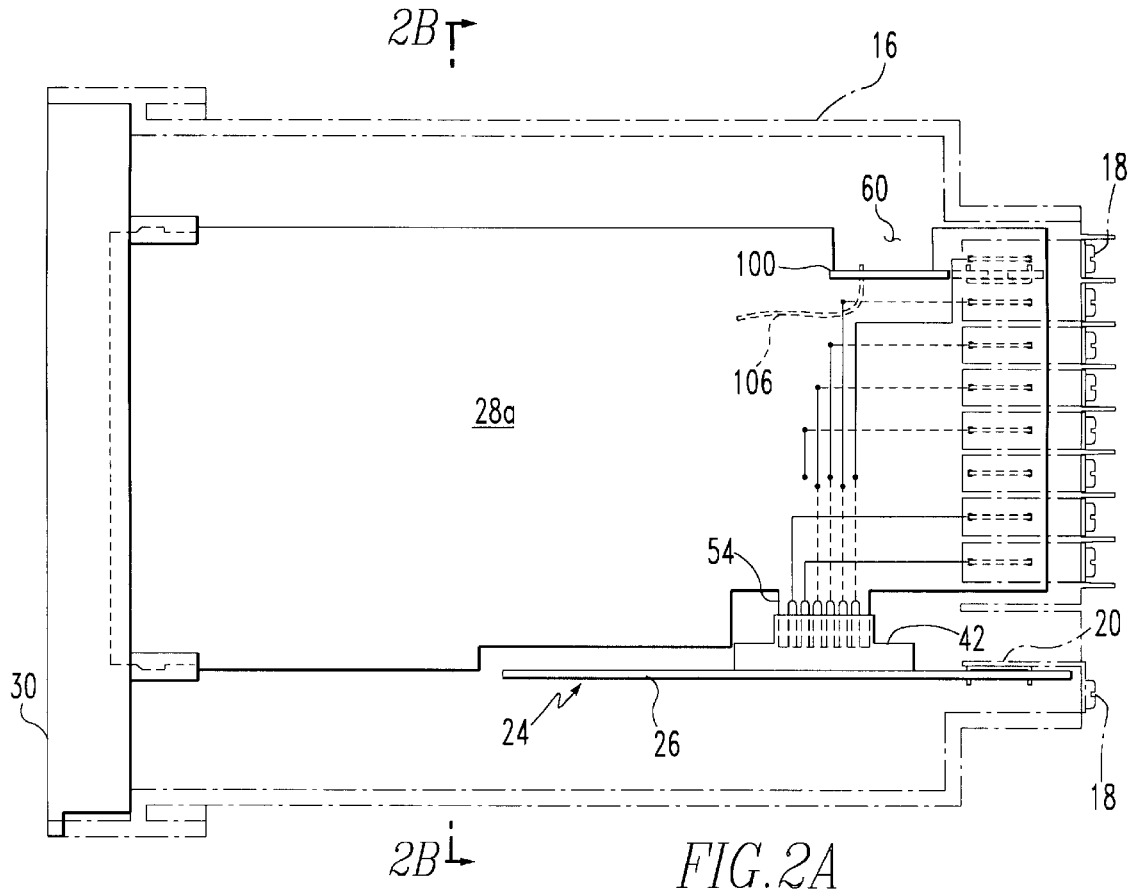
FIGS. 2a and 2b are side and cross-sectional views of the interface adapter of the present invention received in a housing.
Figure 2B:
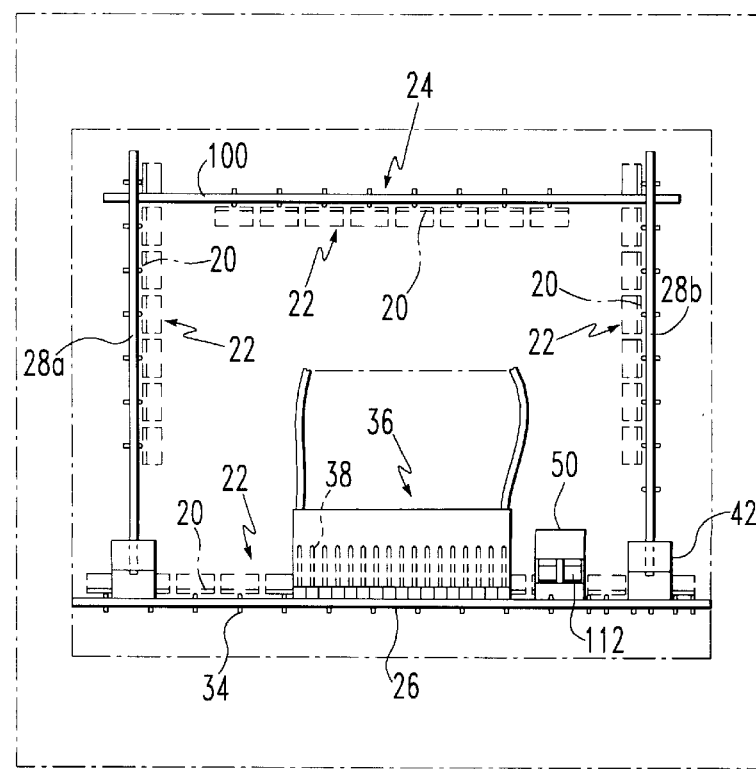
Figure 3C:
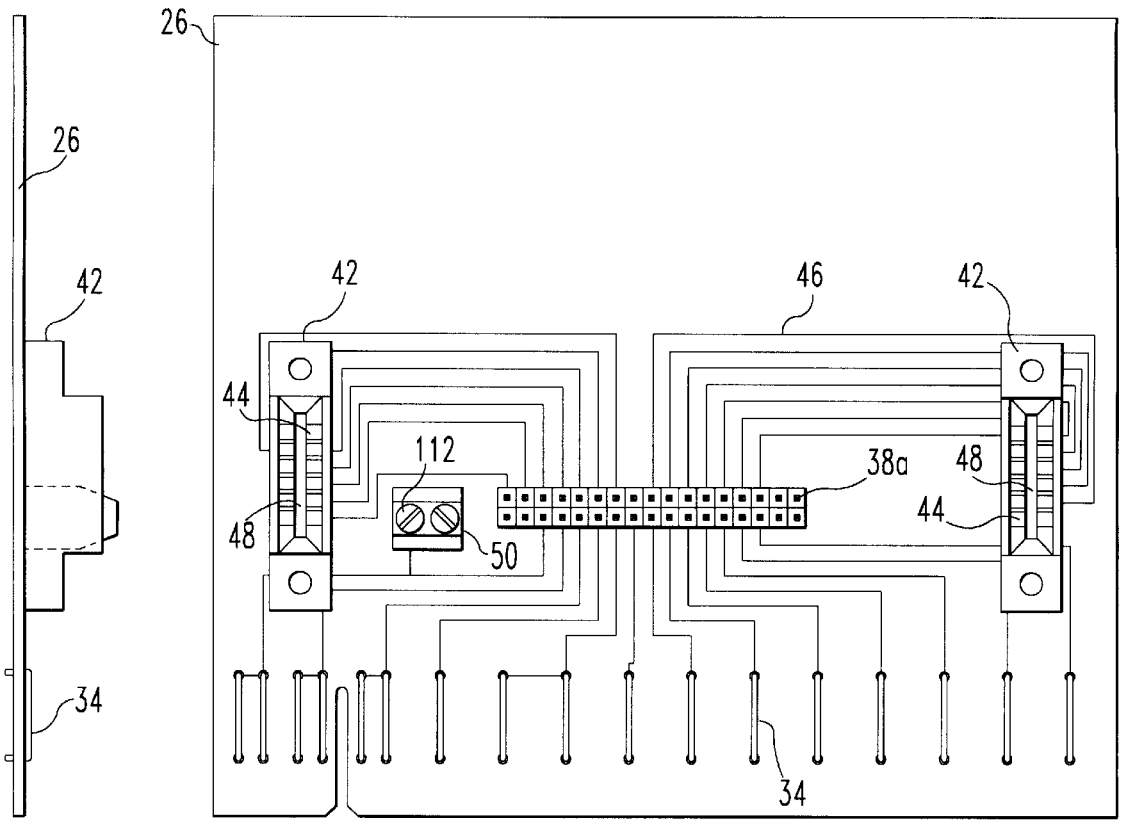
Figure 3C:
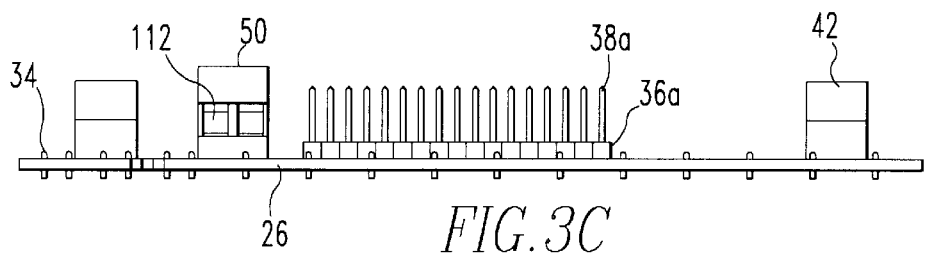
Figure 4B:
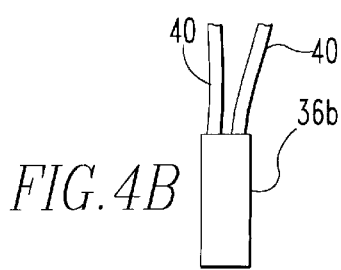
FIGS. 4a–4c are front, side and bottom views of one part of an interface connector of the interface adapter of FIGS. 2a and 2b.
Figure 4A:
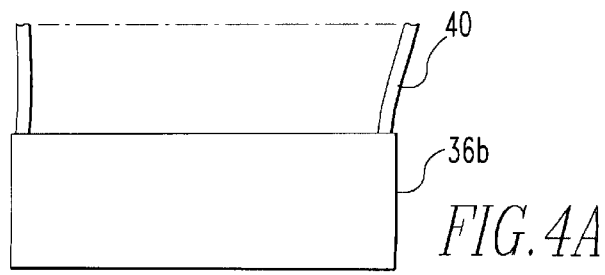
Figure 4C:
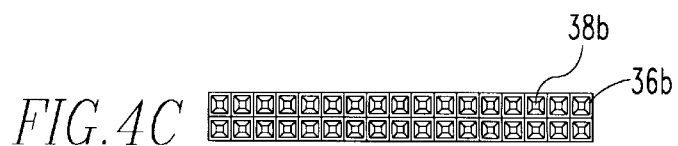

With reference to FIGS. 2a and 2b and with ongoing reference to Figs. 1a–dc, it is often desirable to insert the replacement controller 2 into a housing 16 (shown in phantom) which is configured to receive an older model controller (not shown) having a larger size than the replacement controller 2. The housing 16 is utilized as an interface between the older model controller (or the replacement controller 2) and various input/output devices associated with the controlled process. The housing 16 includes a plurality of screw terminals 18 positioned outside of the housing 16 and connectable via conductive wires (not shown) to the various input/output devices of the controlled process. Each screw terminal 18 is connected to a contact 20 of a housing connector 22 disposed inside the housing 16. Each contact 20 extends through the housing 16 and terminates at the housing connecter 22 which has a second configuration. Since the older model controller has a larger size than the replacement controller 2, the terminals 6 of the replacement controller 2 and the contacts 20 of the housing connector 22 will often have different configurations that prevent the terminals 6 from connecting directly with the contacts 20. Moreover, because of its smaller size, the replacement controller 2 is loosely received in the housing 16. Accordingly, there is a need for a retrofit/interface adapter 24 which snugly secures the replacement controller 2 in the housing 16 and which enables the terminals 6 of the replacement controller 2 to be electrically connected with the contacts 20 of the housing connector 22.

In accordance with the present invention, the retrofit/interface adapter 24 includes a main printed circuit board (PCB) 26, a pair of sideboard PCBs 28a, 28b and faceplate 30.

With reference to FIGS. 3a–4c and with ongoing reference to FIGS. 2a and 2b, the main PCB 26 includes a plurality of first contacts 34 positioned adjacent one end of the main PCB 26. Preferably, each first contact 34 is a staple having opposite ends disposed through plated through holes in the main PCB 26 and having an elongated axis positioned perpendicular to the end of the main PCB 26. An interface connector 36 (best shown in FIG. 2b) is connected between the main PCB 26 and the terminals 6 of the replacement controller 2. The interface connector 36 has a first part 36a connected to the main PCB 26 and a second part 36b. The interface connector 36 includes an array of interface contacts 38. Preferably, each interface contact 38 includes a first part 38a, in the form of an upright pin, connected to the first part 36a of the interface connector 36 and a second part 38b, in the form of a pin receiving cylinder, received in the second part 36b of the interface connector 36. The first and second parts 36a, 36b of the interface connector 36 are couplable so that the first and second parts 38a, 38b of each interface contact 38 connect thereby creating an electrical contact therebetween. A plurality of flexible wires 40 are connected between the second parts 38b of the interface contacts 38 and the terminals 6 of the replacement controller 2 thereby creating an electrical connection therebetween.

The main PCB 26 includes a pair of edge connectors 42 positioned adjacent opposite sides of the main PCB 26. Each edge connector 42 includes a plurality of edge contacts 44 electrically connected to the first parts 38a of the interface contacts 38 via conductive lines 46 formed on the main PCB 26 in a manner known in the art. Preferably, the edge contacts 44 are arranged into two parallel lines positioned in opposition on opposite sides of a receiving aperture 48. The main PCB 26 also includes a thermocouple connector 50.

Figures 5A, 5B, 5C:
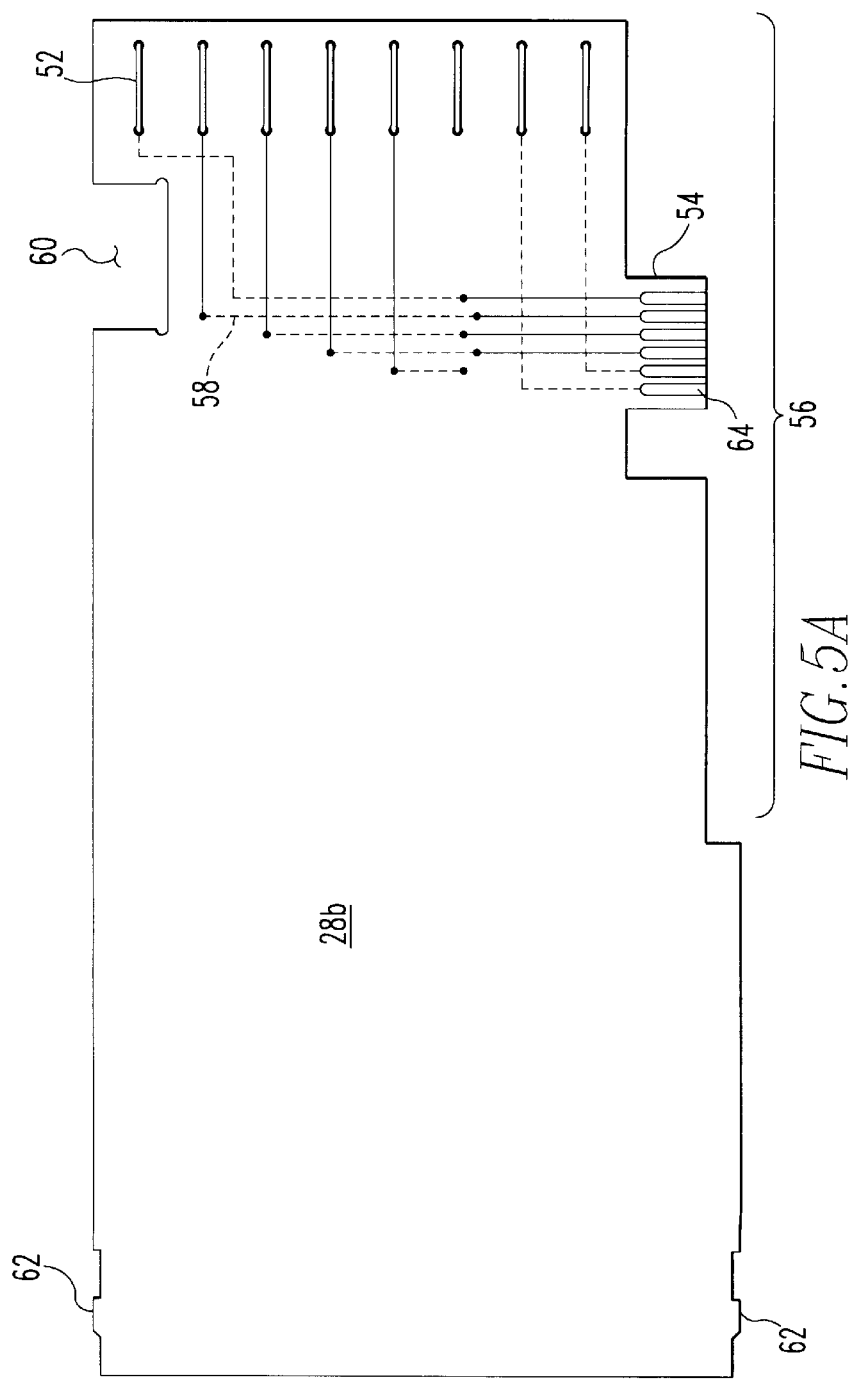
FIGS. 5a–5c are side, top and end views of the sideboard PCB utilized in the interface adapter of FIGS. 2a and 2b.
Figure 6C:
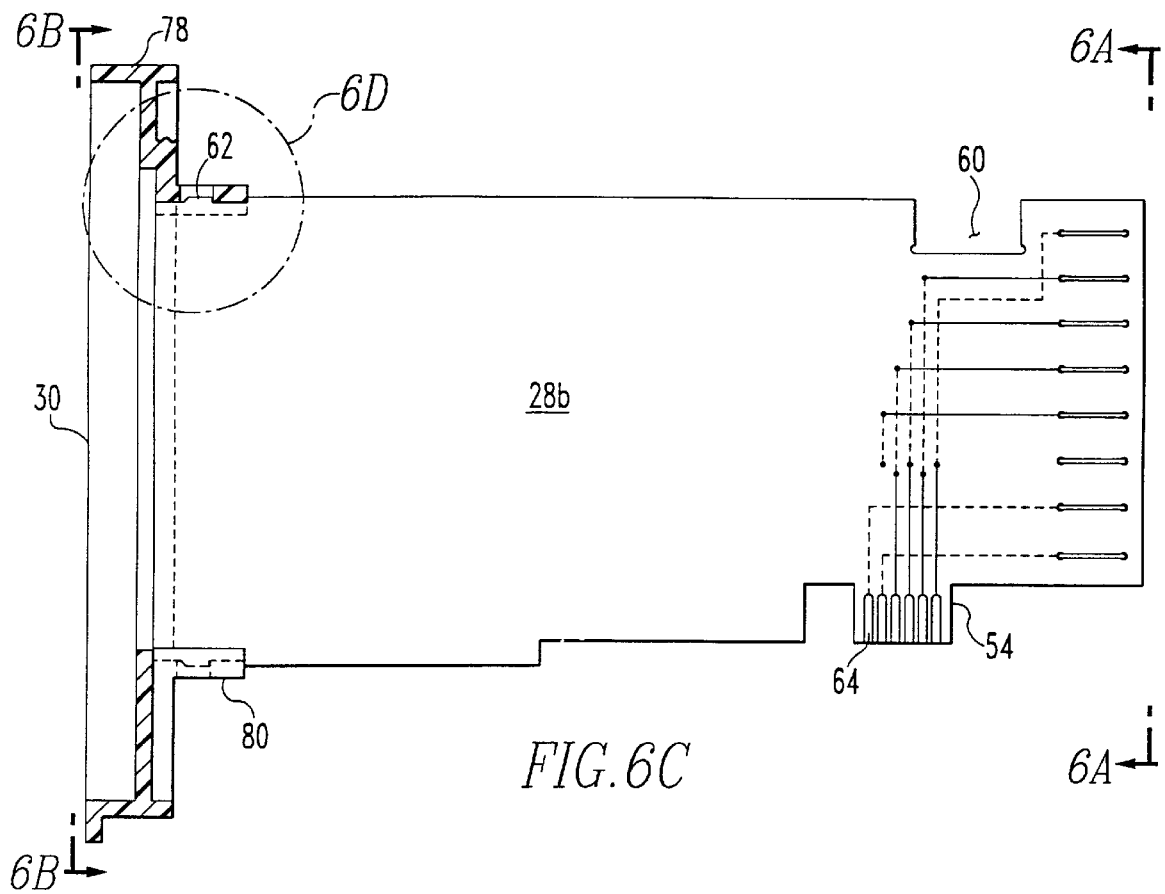
FIG. 6c is a cross-section, side view of the faceplate of FIGS. 6a and 6b including the sideboard PCB received in the braces of the faceplate.
Figure 6D:
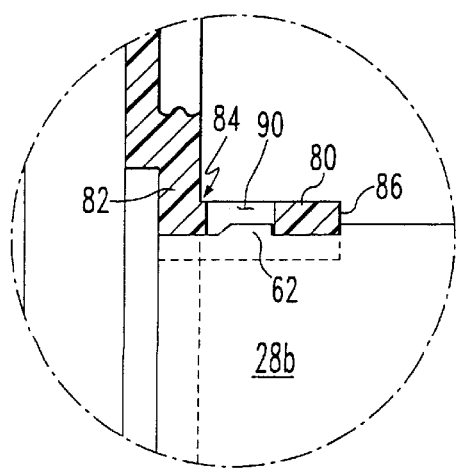
FIG. 6d is an enlarged view of one of the braces and the sideboard PCB of FIG. 6c.

With reference to FIGS. 5a–5c and with ongoing reference to FIGS. 2a and 2b, each of the sideboard PCBs 28a, 28b includes a plurality of second contacts 52 positioned adjacent one end thereof. Preferably, each second contact 52 is a staple having opposite ends disposed through plated through holes in the sideboard PCBs 28a, 28b and having an elongated axis positioned perpendicular to the end of the sideboard PCBs 28a, 28b. Each of the sideboard PCBs 28a, 28b includes a wing-like protrusion 54 extending from a recess 56 formed in one side thereof. A conductive line 58 extends between each second contact 52 and the wing-like protrusion 54. The end of each conductive line 58 opposite its corresponding second contact 52 terminates in a contact pad 64 formed adjacent a distal end of the wing-like protrusion 54. Each conductive line 58 can be formed on one surface of the sideboard PCBs 28a, 28b or can alternate between opposing surfaces of the sideboard PCBs 28a, 28b in a manner known in the art. Each of the sideboard PCBs 28a, 28b has a receiving slot 60 formed on a side thereof opposite the wing-like protrusion 54. Each side of the sideboard PCBs 28a, 28b includes a locking tab 62 formed adjacent an end thereof opposite the second contacts 52. Each wing-like protrusion 54 is configured to be received in the receiving slot 48 of one of the edge connectors 42 so that each contact pad 64 contacts one of the edge contacts 44. Preferably, the pair of sideboard PCBs 28a, 28b are mirror images of each other.

With reference to FIGS. 6a–6d and with ongoing reference to FIGS. 2a and 2b, the faceplate 30 includes a panel 68 having a back surface 70, a front surface 72, a central receiving aperture 74 extending between the back surface 70 and the front surface 72 and a flange 78 positioned around the periphery of the panel 68. The back surface 70 includes two pair of braces 80 that extend normal to the back surface 70. Preferably, a pair of ribs 82 extend between each brace 80 and the flange 78 for supporting the brace 80 normal to the back surface 70. Each brace 80 includes a proximal end 84 attached to or formed integral with the ribs 82, a distal end 86 positioned opposite the ribs 82 and a lengthwise slot 88 extending between the proximal end 84 and the distal end 86. Each brace 80 also includes a tab receiving slot 90 positioned adjacent the proximal end 84.

Each pair of braces 80 is positioned on an opposite side of the central receiving aperture 74 with the lengthwise slots 88 of each pair of braces 80 positioned in opposition to receive opposite sides of one of the sideboard PCBs 28a, 28b. Preferably, the sides of each of the sideboard PCBs 28a, 28b are received in the lengthwise slots 88 of the two pair of braces 80 so that the locking tabs 62 are received in the tab receiving slots 90. The locking tabs 62 and the tab receiving slots 90 coact to couple the sides of the pair of sideboard PCBs 28a, 28b in the lengthwise slots 88 of the two pair of braces 80. When the locking tabs 62 are received in the receiving slots 90, the sideboard PCBs 28a, 28b are preferably positioned normal to the panel 68 and in spaced parallel relation on opposite sides of the central receiving aperture 74.

Figure 7A:
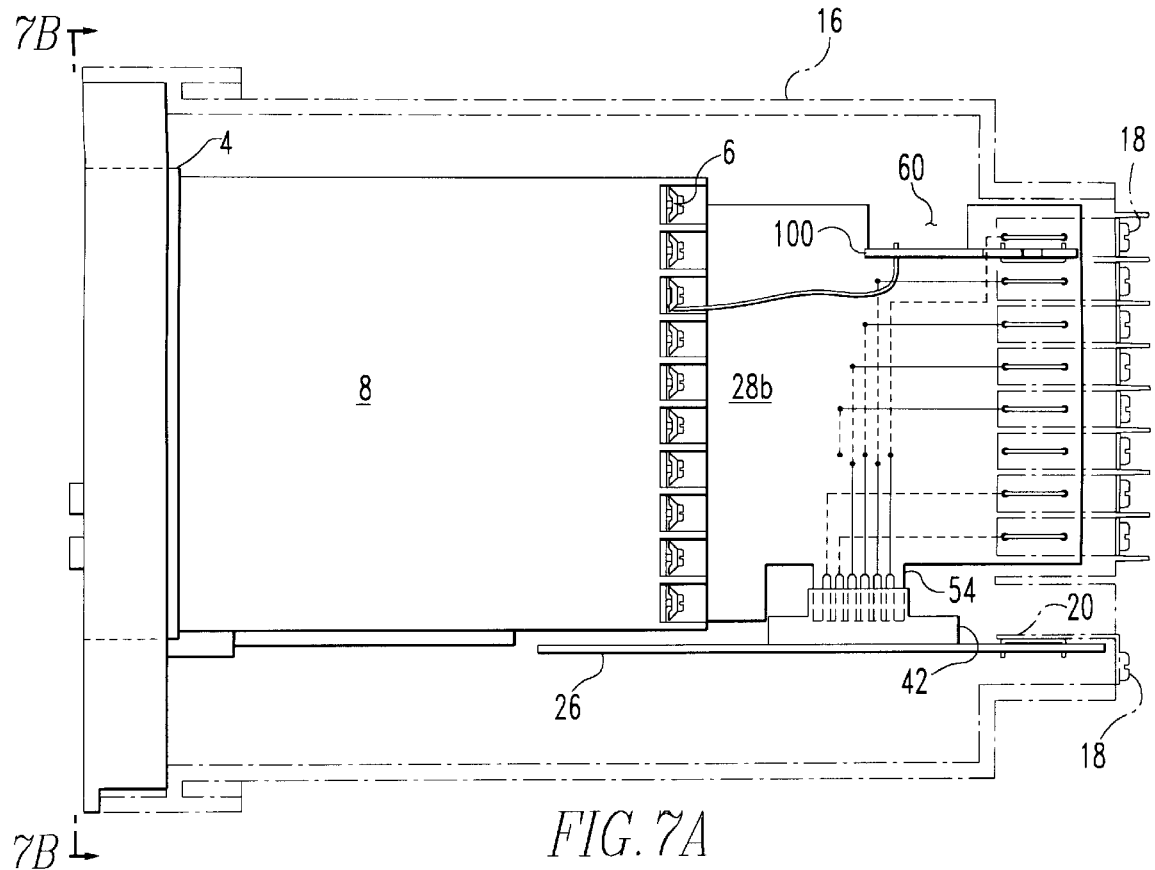
FIGS. 7a and 7b are side and front views of the replacement controller of FIG. 1 assembled to the interface adapter of FIGS. 2a and 2b.
Figure 7B:
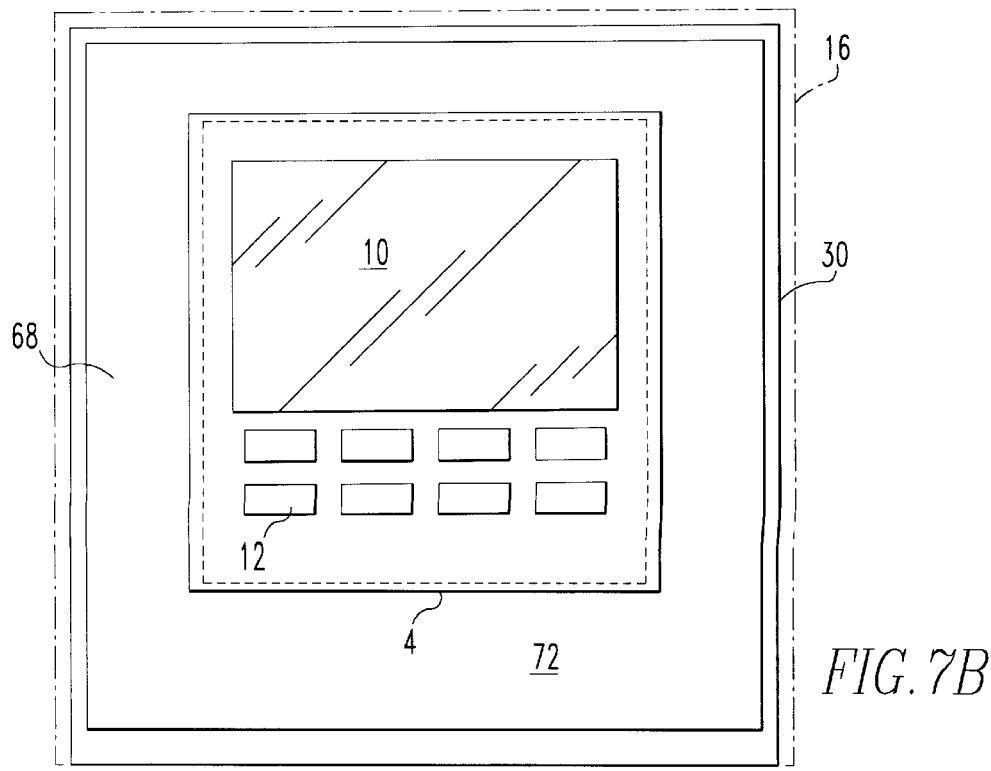

With reference to FIGS. 7a and 7b and with reference back to FIGS. 2a–6d, inserting the wing-like protrusions 54 of the sideboard PCBs 28a, 28b into the receiving slots 48 of the edge connectors 42 causes the contact pads 64 and the edge contacts 44 to move into electrical contact thereby creating an electrically conductive path between the second contacts 52 and the first parts 38a of the interface contacts 38. The edge contacts 44 apply a spring-tension against the pads 64 when the wing-like protrusions 54 are received in the receiving slot 48. This spring-tension maintains the wing-like protrusions 54 received in the receiving slots 48 and maintains the sideboard PCBs 28a, 28b in the spaced parallel relation. The wing-like protrusions 54 and the edge connectors 42 coact to position the main PCB 26 perpendicular to the pair of sideboard PCBs 28a, 28b. Preferably, when the locking tabs 62 are received in the receiving slots 90 and the wing-like protrusions 54 are received in the receiving slots 48 of the edge connectors 42, the main PCB 26, the sideboard PCBs 28a, 28b and the faceplate 30 are positioned orthogonally.

Prior to assembling the replacement controller 2 and retrofit/interface adapter 24 together, the ends of the flexible wires 40 opposite the second part 36b of the interface connector 36 are connected to appropriate terminals 6 of the replacement controller 2. Thereafter, the replacement controller 2 and the retrofit/interface adapter 24 are assembled by inserting the second part 36b of the interface connector 36, the flexible wires 40 and the controller body 8 into the central receiving aperture 74 and between the pair of sideboard PCBs 28a, 28b. The front panel 4 of the replacement controller 2 is moved into seating engagement with the front surface 72 of the panel 68. The first and second parts 36a, 36b of the interface connector 36 are then connected together to form electrically conductive paths between the terminals 6 of the replacement controller 2 and the plurality of first and second contacts 34, 52.

The assembled replacement controller 2 and retrofit/interface adapter 24 is inserted in the housing 16 so that the plurality of first and second contacts 34, 52 are aligned with the contacts 20 of the housing connector 22. Urging the housing 16 and the assembled replacement controller 2 and retrofit/interface adapter 24 together moves the contacts 20 of the housing connectors 22 and the plurality of first and second contacts 34, 52 into electrical contact whereby the terminals 6 of the replacement controller 2 are in electrical contact with screw terminals 18 of the housing 16.

Figure 8B:
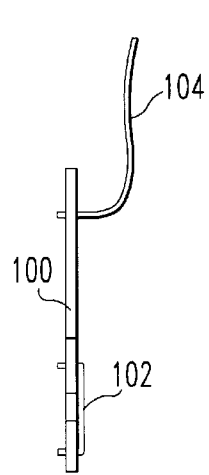
FIGS. 8a–8c are plan, side and front views of an option PCB of the interface adapter shown in FIGS. 2a and 2b.
Figure 8A:
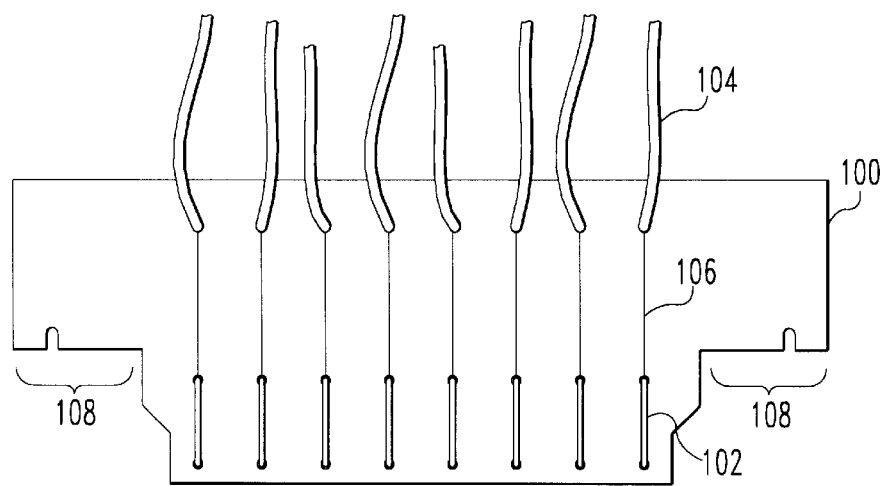
Figure 8C:
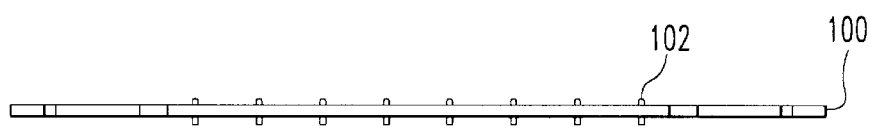

With reference to FIGS. 8a–8c and with ongoing reference to FIGS. 2a and 2b, if additional electrical connections are required between the terminals 6 of the replacement controller 2 and the contacts 20 of the housing connector 22, an option PCB 100 is inserted into the receiving slots 60 of the sideboard PCBs 28a, 28b. The option PCB 100 includes a plurality of third contacts 102 adjacent one end thereof. Preferably, each third contact 102 is a staple having its opposite ends disposed through plated through holes of the option PCB 100 and having its elongated axis positioned perpendicular to the edge of the option PCB 100. Each third contact 102 is connected to a flexible wire 104 via a conductive line 106 formed on the option PCB 100 in a manner known in the art. The ends of the flexible wires 104 opposite the option PCB 100 are connected to appropriate terminals 6 of the replacement controller 2. The option PCB 100 has wings 108 defined on its opposite sides. The wings 108 are receivable in the receiving slots 60 of the sideboard PCBs 28a, 28b. Preferably, opposite sides of the wings 108 frictionally coact with opposite sides of the receiving slots 60 when the option PCB 100 and the main PCB 26 are positioned in spaced parallel relation. Preferably, the option PCB 100 is oriented so that the plurality of third contacts 102 are positioned adjacent the plurality of second contacts 52 of the sideboard PCBs 28a, 28b when the wings 108 are received in the receiving slots 60.

With the reference to FIGS. 2a–3c, the thermocouple connector 50 includes a pair of screw terminal contacts 112. Each screw terminal contact 112 is electrically connected to one or more of the first contacts 34 via one of the conductive lines 46. A pair of conductive wires (not shown) are electrically connectable between the screw terminal contacts 112 and a pair of terminals 6 which are electrically connected to thermocouple sensing circuitry of the replacement controller 2.

Preferably, the thermocouple wires and the flexible wires 104 of the option PCB 100 are connected to appropriate terminals 6 before the replacement controller 2 is inserted into the central receiving aperture 74. When assembling the replacement controller 2 and the retrofit/interface adapter 24, the second part 36b of the interface connector 36, the flexible wires 40, the option PCB 100, the flexible wires 104 and the thermocouple wires are inserted into the central receiving aperture 74 in advance of the replacement controller 2. Thereafter, the controller body 8 is inserted into the receiving aperture 74 and the front panel 4 is seated against the front surface 72 of the panel 68. The first and second parts 36a, 36b of the interface connector 36 are connected, the wings 108 of the option PCB 100 are frictionally engaged in the receiving slots 60 of the sideboard PCBs 28a, 28b and the thermocouple wires are secured to the screw terminal contacts 112 of the thermocouple connector 50. The assembled replacement controller 2 and retrofit/interface adapter 24 is inserted into the housing 16 such that the plurality of first, second and third contacts 34, 52, 102 are aligned with the contacts 20 of the housing connector 22. The housing 16 and the assembled replacement controller 2 and retrofit/interface adapter 24 are urged together so that the contacts 20 of the housing connector 22 connect with the contacts 34, 52 and 102 of the retrofit/interface adapter 24.

Preferably, the plurality of first, second and third contacts 34, 52, 102 are the same. However, one or more of the plurality of first, second and third contacts 34, 52 and 102 can be electrically conductive pads, like contact pads 64, formed on the respective PCB in a manner known in the art.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

What is claimed is:

1. A retrofit/interface adapter for electrically connecting input/output terminals of a controller to contacts of a housing connector having a configuration different than the configuration of the input/output terminals of the controller, the adapter comprising:

a main printed circuit board (PCB) including a plurality of first contacts disposed thereon adjacent one end thereof, an interface connector having a plurality of interface contacts and a pair of edge connectors each having a plurality of edge contacts, with each first contact electrically connected to at least one of the interface contacts, with each edge contact electrically connected to at least one of the interface contacts, with each input/output terminal of the controller electrically connected to at least one of the interface contacts;

a pair of sideboard PCBs, each sideboard PCB including a plurality of second contacts disposed thereon adjacent one end thereof, a protrusion defined on one side thereof and a plurality of conductive lines, with each conductive line extending between one of the second contacts and the protrusion, with the protrusions of the sideboard PCBs couplable with the edge connectors so that each conductive line electrically contacts one of the edge contacts; and a faceplate having a central receiving aperture and two pair of upstanding braces formed on a surface thereof, with each brace defining a lengthwise slot that extends normal to the surface of the faceplate, with each of the pair of braces positioned on an opposite side of the receiving aperture for receiving in the lengthwise slots formed therein opposite sides of one of the pair of sideboard PCBs adjacent the end thereof opposite the second plurality of contacts, wherein:

the opposite sides of the pair of sideboard PCBs are receivable in the lengthwise slots of the two pair of braces so that the pair of sideboard PCBs are positioned normal to the faceplate and in spaced parallel relation on opposite sides of the receiving aperture;

the protrusions of the sideboard PCBs are couplable with the pair of edge connectors so that the pair of sideboard PCBs are maintained in the spaced parallel relation and the main PCB is positioned orthogonal to the pair of sideboard PCBs and the faceplate; and the end of the main PCB having the plurality of first contacts and the ends of the sideboard PCBs having the plurality of second contacts are couplable with the housing connector so that the plurality of first contacts and the plurality of second contacts are in electrical contact with the contacts of the housing connector.

2. The retrofit/interface adapter as set forth in claim 1, wherein:

each brace includes a tab receiving slot;

the tab receiving slots of each pair of braces are positioned in opposition; and each side of the sideboard PCBs includes a locking tab formed therein adjacent the ends of the sideboard PCBs opposite the second contacts, with each locking tab receivable in one of the tab receiving slots when the sides of the pair of sideboard PCBs are received in the lengthwise slots of the braces, wherein the tab receiving slots coact with the locking tabs to couple the sides of the pair of sideboard PCBs in the lengthwise slots.

3. The retrofit/interface adapter as set forth in claim 1, further including:

an option PCB having a plurality of third contacts disposed thereon adjacent one end thereof, with at least one of the third contacts electrically connectable to one of the input/output terminals of the controller, wherein:

each sideboard PCB has a receiving slot on the side thereof opposite the protrusion;

the receiving slots are positioned in opposition when the sideboard PCBs are received in the lengthwise slots of the braces; and the option PCB is receivable in the receiving slots and between the sideboard PCBs, with opposite sides of the option PCB frictionally engaging opposite sides of the receiving slots when the option PCB is positioned parallel to the main PCB.

4. The retrofit/interface adapter as set forth in claim 3, wherein each contact of the plurality of first contacts, the plurality of second contacts and the plurality of third contacts are the same.

5. The retrofit/interface adapter as set forth in claim 4, wherein each contact of the plurality of first contacts, the plurality of second contacts and the plurality of third contacts is one of an electrically conductive wire and an electrically conductive pad.

6. A retrofit/interface adapter for electrically connecting terminals of a controller having a first configuration to contacts of a housing connector having a second configuration different than the first configuration, the adapter comprising:

a main PCB including a plurality of first contacts;

a pair of sideboard PCBs, with each sideboard PCB including a plurality of second contacts and a receiving slot positioned on one side thereof, with each receiving slot having opposed sides;

a pair of first connectors connecting the pair of sideboard PCBs and the main PCB so that the pair of sideboard PCBs are in spaced parallel relation and the receiving slots of the pair of sideboard PCBs are positioned in opposition;

a second connector disposed between the main PCB and the terminals of the controller, with the second connector electrically connecting the terminals of the controller and the plurality of first contacts of the main PCB, with the second connector electrically connecting the terminals of the controller and the plurality of second contacts of the pair of sideboard PCBs via the pair of first connectors; and a faceplate having a receiving aperture configured to receive the controller, with the faceplate attached to the pair of sideboard PCBs so that the sideboard PCBs are disposed on opposite sides of the receiving aperture in the spaced parallel relation, wherein:

the faceplate, the main PCB and the sideboard PCBs are positioned orthogonally; and the plurality of first contacts and the plurality of second contacts are positioned in the second configuration for connecting with the contacts of the housing connector.

7. The retrofit/interface adapter as set forth in claim 6, further including:

an option PCB having a plurality of third contacts, with the option PCB receivable in the receiving slots between the pair of sideboard PCBs so that opposed sides of the option PCB frictionally coact with the opposed sides of the receiving slots, wherein:

the pair of sideboard PCBs secure the option PCB and the main PCB in spaced parallel relation; and the plurality of first contacts, the plurality of second contacts and the plurality of third contacts are positioned in the second configuration for connecting with the contacts of the housing connector.

8. The retrofit/interface adapter as set forth in claim 6, wherein:

each first connector is separable into a first part connected to the main PCB and a second part formed on one of the sideboard PCBs; and the second connector is separable into a first part positioned on the main PCB and a second part electrically connected to the terminals of the controller via one or more flexible conductive wires.

9. The retrofit/interface adapter as set forth in claim 6, wherein:

the faceplate includes two pair of braces;

each pair of braces is positioned on an opposite side of the faceplate receiving aperture;

each brace defines a receiving slot which receives an edge of one of the sideboard PCBs; and each pair of braces are positioned so that the slots thereof are disposed in opposition to receive opposite side edges of one of the sideboard PCBs.

10. A retrofit/interface adapter which enables electrical connection between terminals of a replacement controller having a first configuration and connectors of a housing having a second configuration, the interface adapter comprising:

a main PCB having a plurality of first contacts;

a pair of sideboard PCBs, with each sideboard PCB having a plurality of second contacts and a receiving slot formed in one side thereof;

a faceplate having a receiving aperture configured to receive the replacement controller;

a first securing means for securing the sideboard PCBs and the faceplate together so that ends of the sideboard PCBs are positioned on one surface of the faceplate and the sideboard PCBs are positioned in spaced parallel relation on opposite sides of the faceplate receiving aperture, with the receiving slots of the sideboard PCBs positioned in opposition;

a first electrical connector for electrically connecting the plurality of first contacts and the terminals of the replacement controller;

a second securing means for securing the main PCB and the sideboard PCBs together so that the sideboard PCBs are maintained in the spaced parallel relation, with the second securing means electrically connecting the plurality of second contacts and the terminals of the replacement controller via the first electrical connector, wherein the first securing means and the second securing means secure the main PCB, the faceplate and the sideboard PCBs orthogonally.

11. The retrofit/interface adapter as set forth in claim 10, further including an option PCB having a plurality of third contacts, wherein:

the option PCB is receivable between the sideboard PCBs and in the receiving slots thereof; and edges of the option PCB frictionally coact with edges of the receiving slots of the sideboard PCBs to secure the option PCB therein and in opposition to the main PCB which is positioned adjacent sides of the sideboard PCBs opposite the receiving slots.

12. The retrofit/interface adapter as set forth in claim 10, wherein the first securing means includes:

a plurality of braces formed on the one surface of the faceplate, with each brace having a proximal end and a distal end and a lengthwise slot that extends therebetween, with each brace having a locking tab receiving slot formed therein adjacent the proximal end thereof; and a plurality of locking tabs formed on the sides of the sideboard PCBs, with each side of each sideboard PCB including one of the plurality of locking tabs, wherein the plurality of braces are positioned so that the locking tabs are receivable in the locking tab receiving slots when the side edges of the sideboard PCBs are received in the lengthwise slots.

13. The retrofit/interface adapter as set forth in claim 10, wherein the first electrical connector includes a first part connected to the main PCB and a second part flexibly connected to the terminals of the replacement controller via a plurality of flexible conductors, wherein the first electrical connector first part is couplable to the first electrical connector second part.

14. The retrofit/interface adapter as set forth in claim 10, wherein the second securing means includes:

a pair of edge connectors positioned on the main PCB; and a protrusion formed on a side of each sideboard PCB, wherein the protrusion of each sideboard PCB is couplable with an edge connector positioned on the main PCB.

15. The retrofit/interface adapter as set forth in claim 10, further including a thermocouple connector disposed on the main PCB, wherein:

a thermocouple is connectable with the thermocouple connector via the first contacts; and the thermocouple connector is connectable to thermocouple terminals of the replacement controller via flexible conductors.

* * * * *

UNITED STATES PATENT AND TRADEMARK OFFICE
CERTIFICATE OF CORRECTION

PATENT NO. : 5,997,313
DATED : December 7, 1999
INVENTOR(S) : Robert E. Jones

It is certified that error appears in the above-identified patent and that said Letters Patent is hereby corrected as shown below:

Column 1 Line 12 "Th is" should read --This--.

Column 3 Line 21 "a t" should read --at--.

Column 3 Line 33 "Figs. 1a-dc" should read --Figs. 1a-1c--.

Signed and Sealed this

Fifth Day of September, 2000

Attest:

Q. TODD DICKINSON

Attesting Officer

Director of Patents and Trademarks